United States Patent [19]
Pearson

[11] 4,024,510
[45] May 17, 1977

[54] FUNCTION MULTIPLEXER

[75] Inventor: Robert Charles Pearson, Newark Valley, N.Y.

[73] Assignee: International Business Machines Corporation, Armonk, N.Y.

[22] Filed: Aug. 28, 1975

[21] Appl. No.: 608,411

[52] U.S. Cl. .......................................... 340/172.5
[51] Int. Cl.² ........................................... G06F 9/00
[58] Field of Search ............ 328/63, 48; 307/269; 340/172.5; 445/1

[56] References Cited
UNITED STATES PATENTS

| | | | |
|---|---|---|---|
| 3,001,708 | 9/1971 | Glaser et al. | 340/172.5 |
| 3,629,710 | 12/1971 | Durland | 328/48 X |
| 3,668,646 | 6/1972 | Hemdal | 340/172.5 |
| 3,671,873 | 6/1972 | Haas et al. | 328/63 |
| 3,771,144 | 11/1973 | Belady et al. | 340/172.5 |

Primary Examiner—Mark E. Nusbaum
Attorney, Agent, or Firm—Kenneth P. Johnson

[57] ABSTRACT

Apparatus for timing the occurrence of a variety of control signals by using a storage device forming a pair of registers at each of a plurality of addressable locations and storing in one register a constant value while its corresponding register serves as an accumulator. A repetitive sequence of clock signals is continuously generated and each signal in a sequence is peculiar to a set of one or more addresses and, with other preconditions is operable to effect a comparison between the stored constant and accumulated value at that address. If the accumulated value is not equal to the constant, the accumulated value is incremented by one and both values are stored in their respective registers at their original address; if the two compared values are equal, a control signal is produced and the constant is stored but the corresponding accumulator register is reset to zero.

10 Claims, 7 Drawing Figures

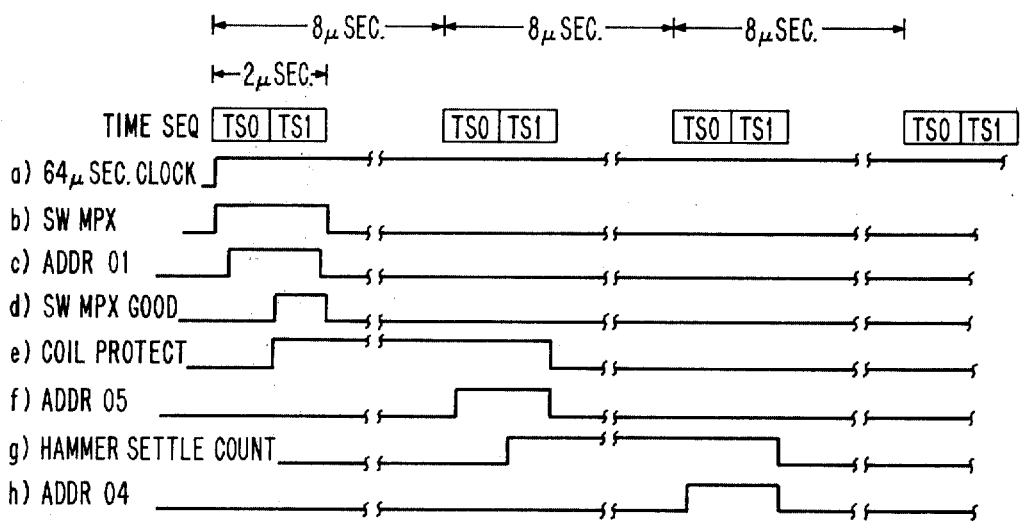

TIME SEQUENCE ASSIGNMENTS

| TS0 | TS1 | TS2 | TS3 | TS4 | TS5 | TS6 | TS7 |
|---|---|---|---|---|---|---|---|
| RD | WR | RD/WR | RD | WR | RD/WR | RD | WR |
| SWITCH MPX | | S T O R A G E | HOME PULSE | | S T O R A G E | NEUTRAL COUNT | |
| COIL PROTECT | | | GATE COUNT | | | DETENT COUNT | |
| HAMMER SETTLE COUNT | | | TRAIN VELOCITY COUNT | | | START CYCLE 1 | |
| | | | | | | START CYCLE 2 | |
| INTERRUPT OVERRUN | | | | | | FAILED TO MOVE | |
| | | | | | | ACCELERATION | |
| SCAN COUNT | | | | | | MISSING FB | |
| | | | | | | EXTRA FB | |
| DIAGNOSTIC SCAN DELAY | | | | | | STOP DELAY | |
| | | | | | | T10 | MDL 1+2 |
| HFT HAMMER RESET | | | | | | SS1 | SS1 |
| | | | | | | SS3 | SS2 |
| | | | | | | | SS3 |
| | | | | | | | SS4 |

FUNCTION MULTIPLEXER

BACKGROUND OF THE INVENTION

The control of complex machines and data handling systems frequently requires the generation of a large number of accurately timed signals to initiate the performance of various functions. In the past, the particular timings have been obtained in various ways. For example, counters may be set to some value and then decremented to zero by the application of pulses from a continuously running clock. Another technique is to provide single shot multivibrators set to various time durations thereby establishing an output signal at a certain interval after the occurrence of an initiating event. Either of these techniques perform accurately and reliably, but become expensive when large numbers of independent or unrelated timing signals are needed among diverse functions.

The provision of a counter or single shot and its required gates for each function to be controlled becomes prohibitive as to cost when dozens of timing signals are required. In addition, adjustment or change may be required after installation of the circuits as changes in function or circuit design occur. Many of the counters or single shots can be adjusted as to settable count or pulse duration but such changes are difficult and time consuming to accomplish, particularly when there are numerous changes to be made.

A further disadvantage has been noted in the data processing field in which the central processor control is required in many instances to provide counter settings or single shot initiation pulses. This, at times, conflicts with processing being carried on by the control unit and results in delays and repetition of certain program steps.

It is, accordingly, a primary object of this invention to provide apparatus in which timing signals for various functions can be accurately and reliably generated without the necessity of duplicating many of the control circuits heretofore required.

A further object of this invention is to provide apparatus for providing timing signals over a wide range of time intervals which eliminates the necessity of multiple clock frequencies heretofore required.

A still further object of this invention is to provide apparatus for producing timing signals in which several counts from the apparatus can be running concurrently.

Yet another object of this invention is to provide apparatus for producing timing signals which can be readily changed by merely addressing a memory unit.

A still further object of this invention is to provide apparatus for producing timing signals which is simple and relatively inexpensive, assembled from commonly used circuit modules and chips and lends itself to integrated circuit production.

Another important object of this invention is to provide apparatus for producing timing signals which is capable of relieving the central processing unit of dedicated monitoring control heretofore required in many instances.

SUMMARY OF THE INVENTION

The foregoing and other objects are obtained in accordance with the invention by providing a pair of storage devices each having a plurality of storage locations with a location in each device corresponding to a location in the other device and corresponding locations each accessable by a common address. The storage locations in one storage device are written to contain a constant while the corresponding location in the other storage device is initially set at zero and serves to accumulate counts representing clock sequences. A clock and counter circuit are provided to produce a pulse sequence that is repetitive and continuous. Each pulse in a sequence is uniquely associated with a set of one or more addresses and is operable either directly or indirectly with other conditions to effect the addressing of a pair of corresponding storage locations and the comparison of the values of data stored at the two locations. If there is no equal-compare, the constant value remains as stored at its original location, but the value of the corresponding accumulator data is incremented by one and then stored in its original location at the same address. If, during comparison, an equal-compare signal occurs, a function-initiating or timing signal is generated and the constant remains stored at its original address, but the accumulator data is reset to zero for storage.

This arrangement of storage devices and controls facilitates the common storage at different addresses of a large number of different constants which can be each compared during each clock sequence or at some lesser frequency by combinational logic gating. Although the multiplexing circuit has been described as comprising a pair of storage devices, these devices can be conventional data processing memory elements such as solid state memory modules or half-word registers. By using an addressable storage device to retain constants representing the number of clock sequences required, the constants can be changed merely by addressing and writing in new replacement values. It will be noted that the clock frequency and sequence length can be readily changed to accommodate the necessary timing frequencies and numbers of addressable storage locations. Also, the value of stored constants can vary widely from one loction to another in the storage device, thus facilitating the generation of timing signals having widely differing frequencies.

The foregoing and other objects, features and advantages of the invention will be apparent from the following more particular description of a preferred embodiment of the invention as illustrated in the accompanying drawing.

BRIEF DESCRIPTION OF THE DRAWING

FIG. 2 is an illustration of signals used in a sequence and their assigned functions;

FIGS. 6 and 7 are timing diagrams for the circuit shown in FIG. 5.

DETAILED DESCRIPTION OF A PREFERRED EMBODIMENT

Figure 1:
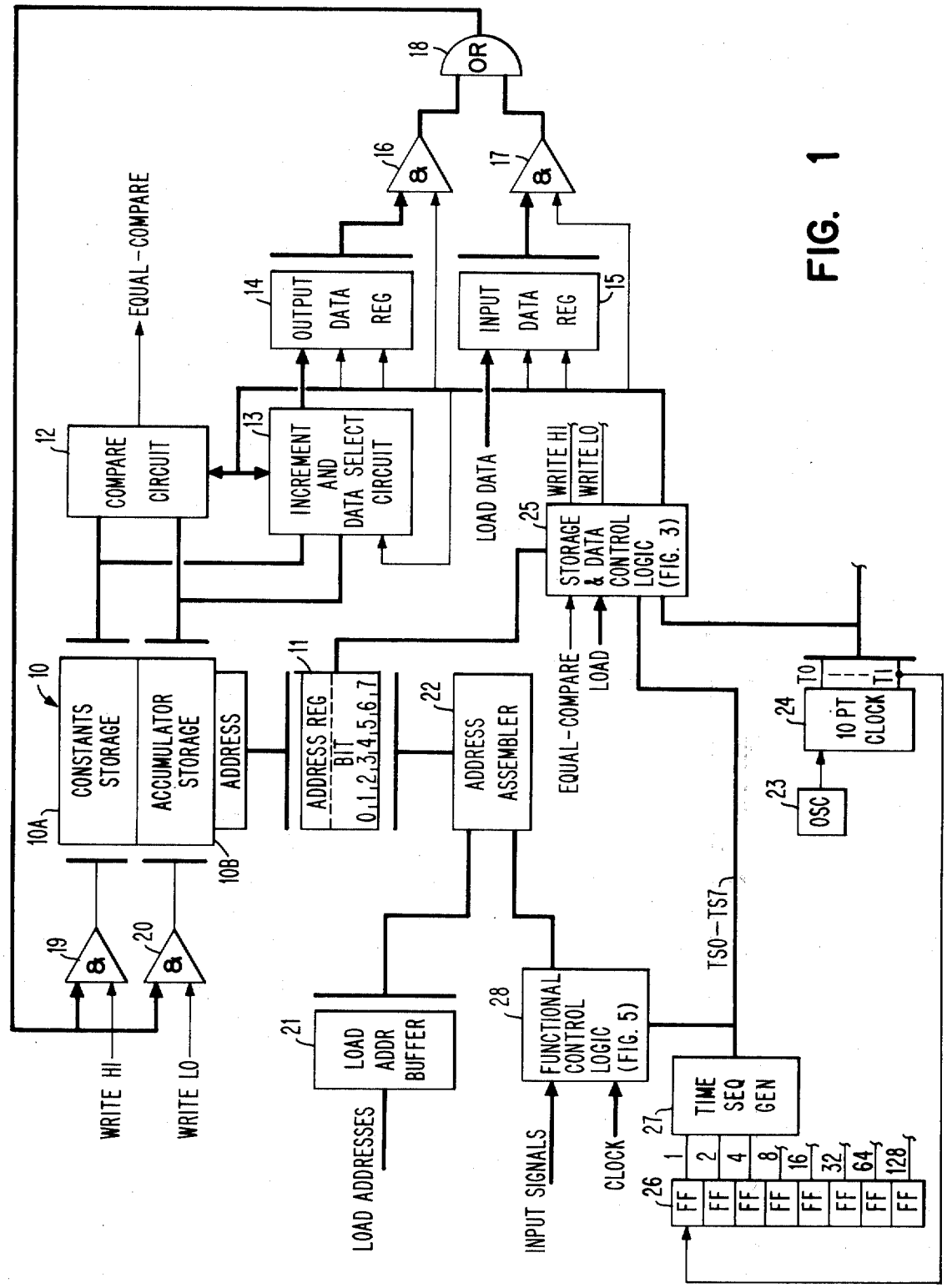
FIG. 1 is a schematic diagram of the function multiplexing apparatus constructed in accordance with the principles of the invention.

Referring to FIG. 1, the function multiplexer is shown schematically and comprises a storage device or memory indicated generally as 10, connected by input buses to its address register 11, a compare circuit 12, an increment and data select circuit 13 which is in turn connected to an output register 14. There is also provided for loading data for storage an input register 15 and both output registers 14 and input register 15 are connected through gates 16 and 17, then through common OR 18 by bus to input gate circuits 19 and 20 and to storage device 10.

The storage unit 10 may be any of various conventional, commercially available memory devices and for purposes of this description will be considered as a half-word FET memory module. The module is capable of storing two eight-bit bytes of data at each address and has address locations designated 0 through 255. The memory is divided into two parallel memory units, one being for storage of constants at 10A and the other being an accumulator storage unit 10B. Energization of a particular address gates two corresponding byte locations in the two memory units 10A and 10B and these memory units can be written into independently of one another but are read out simultaneously when addressed. Additionally, storage device 10A for the constants is preferably a non-destructive readout, while data of the accumulator portion at an address location are destroyed when written back.

The storage device is used in accordance with the invention by storing in the constants portion 10A some value which is representative of the number of timed pulse sequences required between the occurrence of two timed control signals for a machine function. The accumulator storage-portion 10B is initially set at zero value and on the occurrence of a particular sequence signal is read out of storage and compared with a corresponding constant value. If the accumulator value does not compare with its corresponding constant then the accumulator value is incremented by one and rewritten in storage 10B. The several constants that are stored may be interrogated once each cycle or at longer intervals depending on the required generation of the particular function timing signals.

Data are loaded into the constants storage portion 10A by supplying addresses successively to a load address buffer 21 and the storage data to input data register 15. The address data from buffer 21 is then supplied through address assembler 22 to address register 11 while its corresponding storage data are gated from register 15 through AND 17, OR 18 and AND 19 under the control of the several gating signals as will be seen later with regard to FIG. 2.

The gating signals and operating control logic are all related to a clock which comprises an oscillator 23 operating, for example, at a frequency of 10MHz which supplies pulses to a binary flip-flop clock circuit 24 which provides pulses T1 through T0. These latter 100 nsec. pulses are supplied to storage and data control logic 25 primarily for gating data into storage device 10 and controlling its flow to the compare circuit and to and from the input and output registers. Time sequence pulses, designated TS0 through TS7, and other lower frequency pulses are obtained from the clock by using clock pulse T1 to cycle a counter 26 comprised of a second series of binary flip-flops to provide timing sequence pulses at from 1 to 128 usec. intervals. However, signals TS0 through TS7 are those used to accomplish addressing of the storage device and are supplied to function control logic circuit 28 described below with reference to FIG. 5. The function control logic 28 activates the particular storage addresses required for interrogation and establishes the priorities of particular timing signals that are contained in the constants storage 10A.

In FIG. 2 there are shown examples of some of the function control signals required for a line printer. Each of these signals require two time sequence signals, for example, TS0 and TS1, TS3 and TS4, and TS6 and TS7 to accomplish read and write when comparing data from the storage unit. The function control signals are listed under their related pair of TS signals either in order of priority with signals of least priority at the bottom or in sequence of use. The first TS signal of each pair is for reading storage and the second is for writing. Signals TS2 and TS5 are reserved for reading or writing data in the storage unit.

The number of TS signals in a sequence can be varied according to need in the timing control. Thus, the sequence signal can be changed and even the duration of each TS signal if necessary. A sequenced signal TS0-TS7 is shown and used here merely for illustration.

Figure 3:
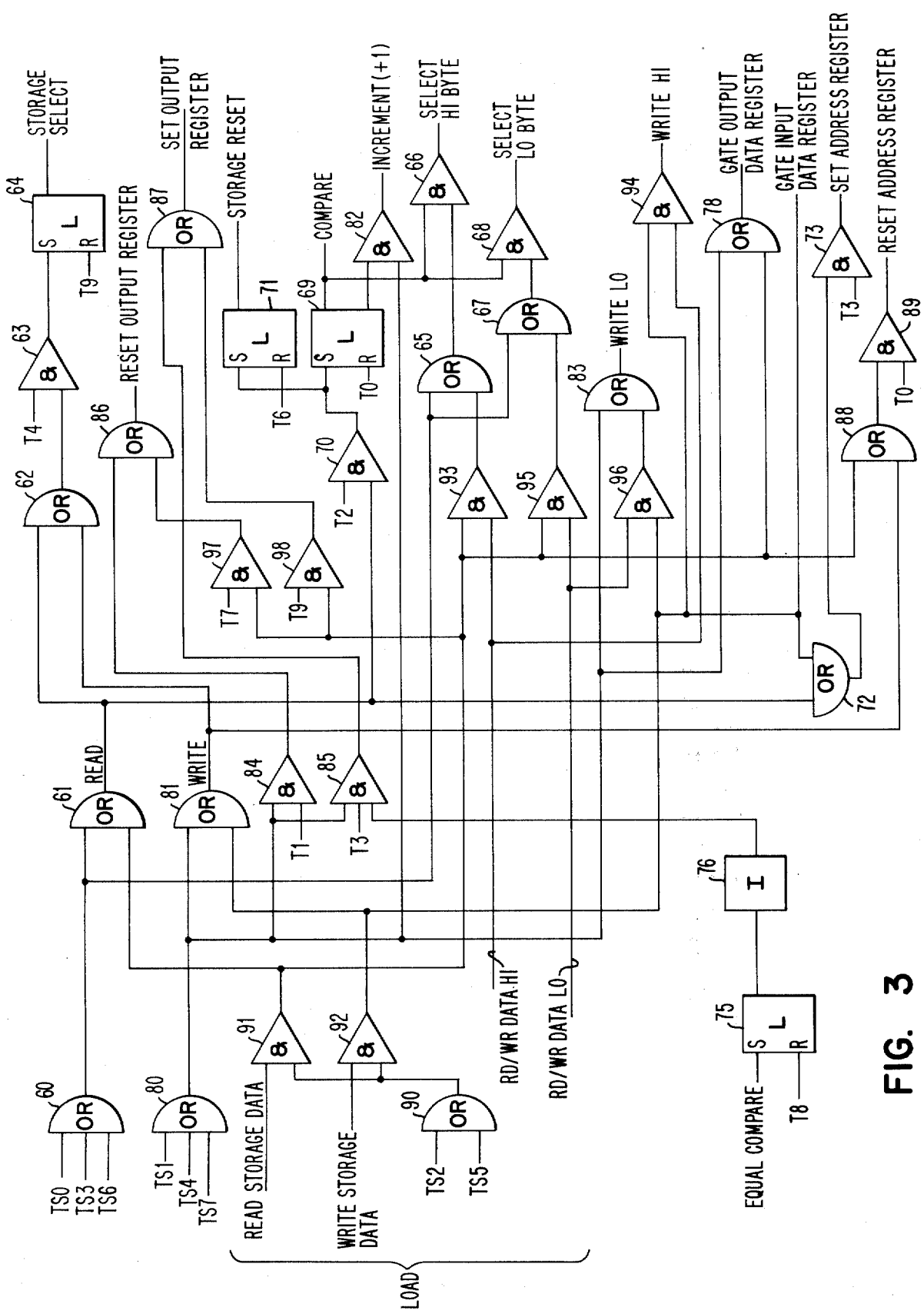
FIG. 3 is a circuit diagram of storage and data control logic that may be used in the operations of the function multiplexing apparatus of FIG. 1.
Figure 4:
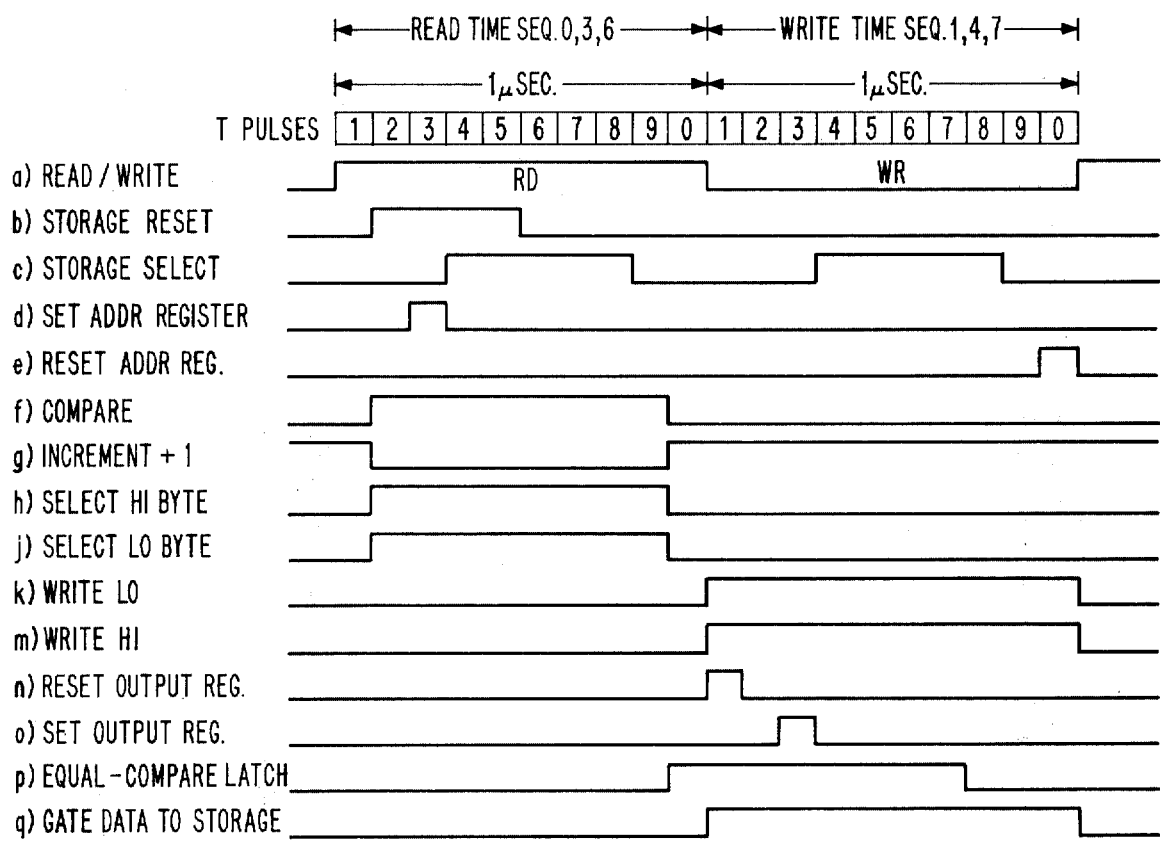
FIG. 4 is a timing diagram for the circuits shown in FIGS. 1 and 2.

An example of a circuit that may be used in the storage and data control logic 25 of FIG. 1 is shown in greater detail in FIG. 3 and related timing diagram of FIG. 4. This circuit controls the data transfer into and out of storage device 10 and the function of the compare circuit and several registers required for the storage device. The relationship of time sequence signals and clock pulses is shown at the top of FIG. 4, wherein each TS signal is one microsecond long and includes therein 10 clock pulses T1-T0. Assume that the constants and accumulator data have been written into storage device 10. Upon the occurrence of signal TS0 at OR 60 (waveform a of FIG. 4) a resultant pulse is generated from OR 61 designated a "read" signal which is effective through OR 62 in conjunction with T4 time at AND 63 to set latch 64 and provide a storage select signal which gates storage unit 10 for readout, (waveform c of FIG. 4). The TS0 signal from OR 60 is also applied at OR 65 to condition AND 66 and also at OR 67 to condition AND 68. Both ANDs 66 and 68 are blocked by the off state of compare latch 69.

Returning to OR 61, its TS0 output conditions AND 70 and at T2 time sets storage reset latch 71 and also compare latch 69 (waveforms b and f of FIG. 4). The resets of latches 64, 69, and 71 occur at the respective T9, T6 and T0 times. The read signal of OR 61 is also supplied through OR 72 to AND 73 which then is operable at time T3 to set the storage address register 11 shown in FIG. 4 at waveform d. Thus, in sequence, a storage reset signal for storage device 10 in FIG. 1 is provided, an address is set in register 11 and at a following T time data are read out into a compare circuit 12 and also to increment and data select circuit 13.

Both the constant and accumulator data are read out under the control of gating signals at ANDs 66 and 68 of FIG. 3 when the compare latch is turned on. In the drawing, HI and LO indicate the constants and accumulator data bytes, respectively. If the two bytes of the compare circuit 12 of FIG. 1 are equal, then a signal appears in FIG. 3 to set equal-compare latch 75 whose on output is inverted at inverter 76 and is supplied as a blocking input to AND 85 to temporarily suppress the gate signal through OR 87 which is normally effective to gate the output data register for again storing the accumulator data byte. The suppression of the output register gate signal is effective to prevent the rewriting of accumulator data and this results in the accumulator being effectively reset to zero to begin a new accumulation. The reading sequence as just described also occurs for subsequent time sequence signals TS3 and TS6.

After the read signal TS0 terminates, signal TS1 at ORs 80 and 81 provides a "write" signal, and through OR 62 it conditions AND 63 which is effective at T4 time to again set storage select latch 64. This gates the appropriate accumulator byte for storing an incremented value. The TS1 signal gates AND 82 which provides an output signal with the compare latch 69 off to cause incrementing of the accumulator byte of data which was compared during the preceding readout. The signal from OR 80 is transmitted through OR 83 to provide a write LO signal for the accumulator (waveform k of FIG. 4). The reset and set of the input register are accomplished by combining the TS1 signal from OR 80 with T1 and T3 times, respectively, and ANDs 84 and 85 for output signals at corresponding ORs 86 and 87 (waveforms n and o of FIG. 4). The address register is reset by the write pulse from OR 81 to OR 88 which is operable at the end of TS1 to reset the storage address register through AND 89.

The initial loading of data into the storage device 10 will be briefly described with reference to FIGS. 3 and 4. It will be recalled from FIG. 2 that loading occurs only during the generation of signals TS2 and TS5. Thus, in FIG. 3, these two signals appear at OR 90 and serve as activating signals at AND gates 91 and 92 when conditioned by either a read or write storage data signal. Data may be read out, if desired, to determine what has been stored already. Assuming that a write storage data signal is present at AND 92 and that data is to be written into both storage portions 10A and 10B, then read/write data high and read/write data slow signals will be present as inputs to ANDs 93 and 94, and 95, and 96, respectively, in FIG. 3. The occurrence of an output from AND 92 is propogated through OR 81 and OR 62 to AND 63 and at T4 time will set the storage select latch (waveform c of FIG. 4). The output from AND 92 also, with the read/write data low signal, results in an output from AND 96 through OR 83 to provide a write low gate (waveform k of FIG. 4). A signal from AND 92 also is effective at AND 94 in conjunction with the read/write data high to generate a write high gate signal (waveform m of FIG. 4). The signals from OR 83 and AND 94 are used in FIG. 1 to gate the inputs to both storage devices 10A and 10B. The write signal from AND 92 is also directly used to gate the input data register 15 of FIG. 1.

In the event data is to be read out from storage device 10, a signal is provided to condition AND 91 and, during the occurrence of signals TS2 or TS5, this AND is effective through ORs 61 and 62 during T4 time at AND 63 to set the storage select latch. The output from AND 91 also is applied at ANDs 93 AND 95 where it is effective in conjunction with the read/write data high and the read/write data low signals to provide selection signals for the high and low bytes during reading at ANDs 66 and 68 which are gated by the setting of compare latch 69. The compare latch is turned on by any read signals through OR 61. The output register is gated also by the signal from AND 91 through OR 78 and this read signal through OR 88 conditions AND 89 for resetting the address register at T0 time. The output register is reset and set during read times TS2 and TS5 through ANDs 97 and 98 at T7 and T9 times, respectively, operating through corresponding ORs 86 and 87.

Figure 7:
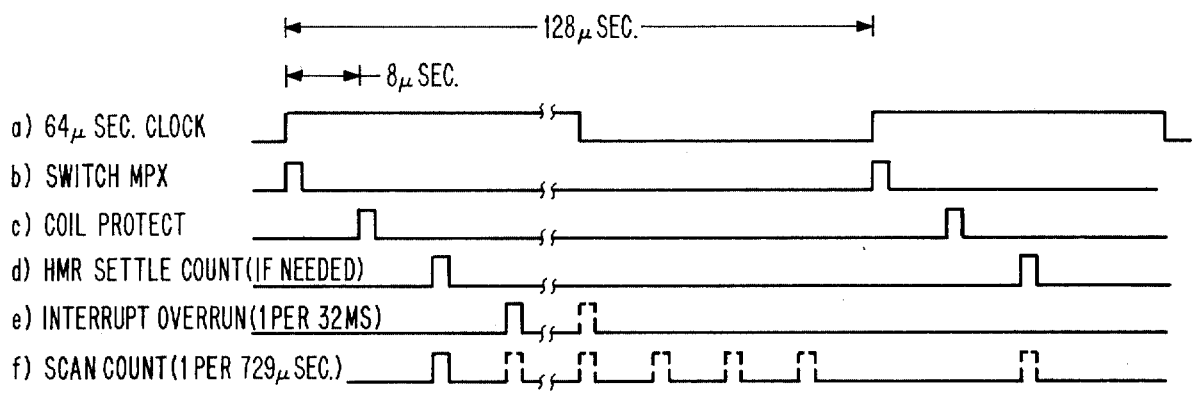
Figure 5:
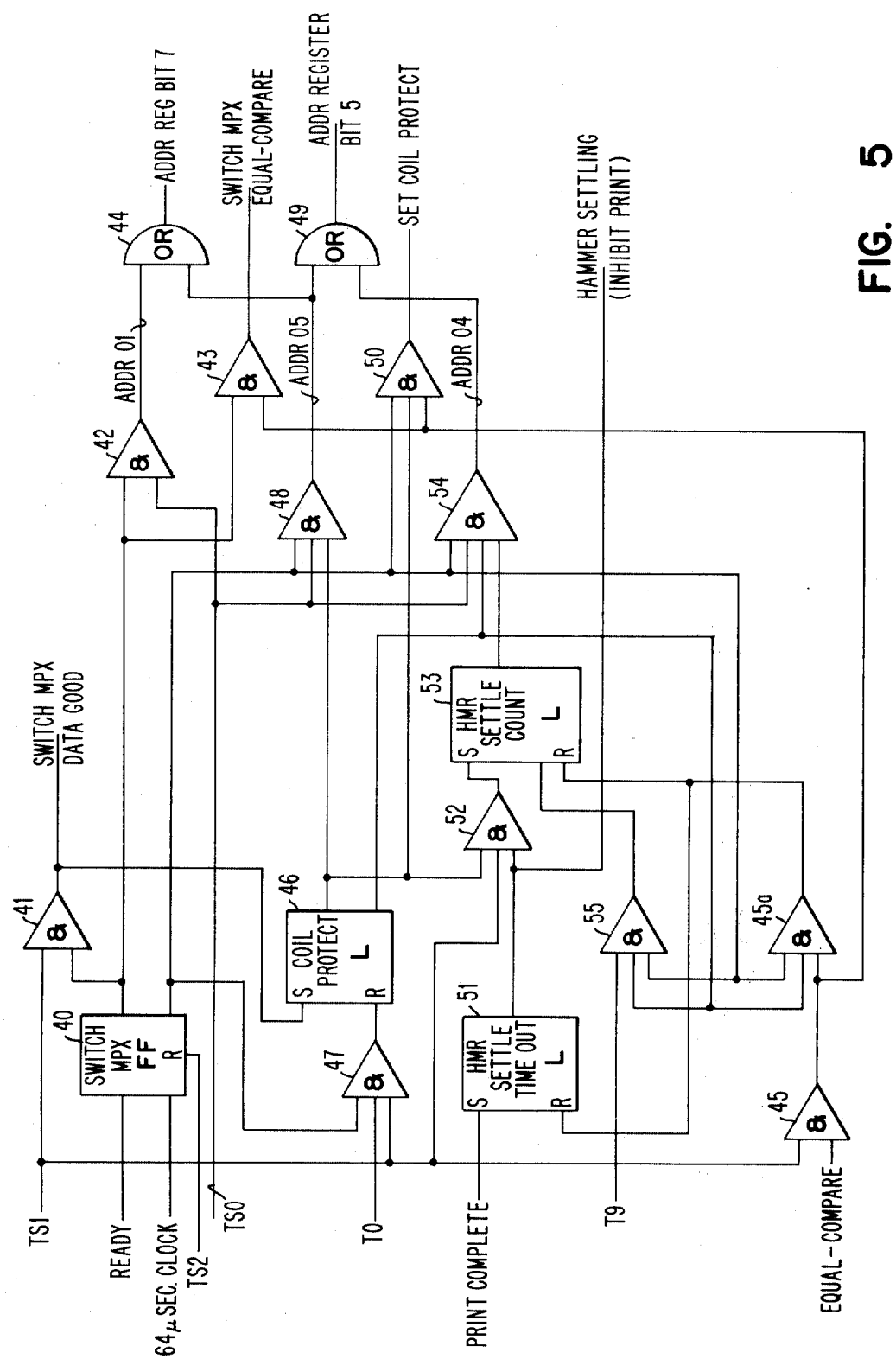
FIG. 5 is a circuit diagram of the control logic for generating storage addresses and function timing signals.

The control logic 28 of FIG. 1 is shown in greater detail in FIG. 5 and timing diagrams of FIGS. 6 and 7, and illustrates a logic arrangement that may be used to obtain some of the function control signals listed. As a detailed example, the signals of switch multiplex, coil protect and hammer settle count using TS0 and TS1 are described. In considering switch multiplexing, a ready signal from a printer is combined with a 64 usec clock pulse, available from the counter 26 of FIG. 1 to set switch MPX flip-flop 40 in FIG. 5. The on output of flip-flop 40 appears as an input to ANDs 41, 42 and 43. Upon the occurrence of time sequence signal TS0 as an input to AND 42 an output signal therefrom, which may be considered representing address "01" is applied to OR 44 (see waveforms a, b, and c of FIG. 6). This signal is then transmitted to address register 11 of FIG. 1 as representing a binary one in the bit 7 position thereof. As described above, in regard to the circuit of FIG. 3 and timing diagram of FIG. 4, the occurrence of signal TS0 results in storage device 10 being placed in a read mode and the address register is set at time T3. This results in data read out of both constants portion 10A and accumulator portion 10B to the compare circuit of FIG. 1. In addition, the accumulator portion is transmitted to the increment and data select circuit 13.

Returning to FIGS. 5 and 6, at the occurrence of the sequence signal TS0, flip-flop 40 can be switched on only during the rise of a 64 pulse and is reset at every TS2 signal. Therefore, the checking of the switch multiplexing flip-flop by the data in storage device 10A and 10B may occur only once during each 128 usec interval. Since a switch multiplex equal-compare signal is desired approximately every 32 ms., the constant in storage 10A for a byte at address 01 is set at a value of 256.

During the comparison of the constant and accumulator values, as mentioned above, the accumulator byte is incremented by a +1 at circuit 13 in FIG. 1 and transmitted to output data register 14 then again stored in its original location at storage 10B. This occurs, as described above, during signal TS1. However, if an equal-compare signal is produced from circuit 12 during TS1 that signal is applied in FIG. 5 from AND 45 to AND 45a and to AND 43. Since flip-flop 40 was assumed to be turned on, AND 43 produces a switch multiplex equal-compare signal at its output which may be used, for example, to synchronize the attached printer or set a timed status interrupt. At the occurrence of signal TS2, the flip-flop 40 is reset.

As illustration of the priority rating of signals, assume that switch multiplex flip-flop 40 was on at TS1 time. The output of AND 41 is then effective to set the coil protect latch 46 (waveform e of FIG. 6). Although TS1 and T0 signals appear at AND 47, the gate is blocked because flip-flop 40 is on. Thus, the coil protect latch will remain on until the next occurrence of TS1, one cycle later during which the preceding TS2 is able to reset flip-flop 40. The on output of latch 46 and off output of flip-flop 40 are conditioning signals to AND 48 and at the occurrence of TS0 and 48 provides an output that is address "05" (waveform f of FIG. 6).

This signal appears through OR 44 and OR 49 to indicate ones in both the bit 7 and bit 5 positions of the address register 11 of FIG. 1. Thus, on the readout from the storage device the two bytes from address "05" will be compared to determine whether an equal-compare signal occurs. If and equal-compare signal does occur, it will result in the signal being produced at the output of AND 50 in FIG. 5 since that AND was conditioned by latch 46 being on and flip-flop 40 being off. This results in a signal entitled "set coil protect". If no equal-compare signal occurred for address "05", the coil protect latch 46 is reset at the next T0 time during the next sequence signal time TS1 at AND 47.

It will be noted that the coil protect latch 46 can be set only when switch multiplex flip-flop 40 is on and the latter can be turned on only every 128 usec. If it is desired to check the status of the coil protect latch about every 4 ms., then the constant value stored in address "05" of storage 10A would be 32.

As further illustration of the priority determination, the hammer settle count function is described. When a print line has been completed, a signal appears to set hammer settle timeout latch 51 which in turn is effective at AND 52 to set the hammer settle count latch 53 at TS1 time only if the coil protect latch 36 is on (waveforms e and g of FIG. 6). The output of latch 53 is supplied as a conditioning input to AND 54. However, AND 54 is blocked until the switch multiplex flip-flop 40 and coil protect latch 46 have both been turned off. Thereafter, durint TS0 time, AND 54 is effective to produce an output at OR 49 for address "04" at bit 5 position in the storage address register of FIG. 1 (waveform h of FIG. 6). This address "04" of the storage device 10 will be interrogated for comparison of the constant and accumulated values. If an equal-compare signal is produced during TS1 time AND 45a produces a reset for the hammer settle timeout latch 51 and hammer settle count latch 53 since it was fully conditioned by flip-flop 40 and latch 46, each being off. To assure that the latch 53 retains its third rank in priority, AND 55 is provided which is effective at the next T9 time when flip-flop 40 and latch 46 have both been turned off and there has been no equal-compare signal generated. This assures that latch 53 can be turned on only for the next sequence of TS signals when coil protect latch 46 has already been on. The hammer settle count latch 53 need not be checked as often as the coil protect latch and the constant value stored may, for example, be 100 or 12.8 ms. Latch 53, it will be noted, can be turned on only when flip-flop 40 is on so that latch 46 can be turned on.

The effective priority for some of the function control signals shown under TS0 and TS1 of FIG. 2 are indicated by the timing diagram of FIG. 7. It will be noted that the switch multiplex cycle, coil protect cycle, and hammer settle count cycles follow in the successive time sequence cycles. The diagram further shows that the interrupt overrun cycle and scan count cycle can occur also in succession. It is to be noted that not all of these controls are always necessary. For example, the hammer settle count cycle will not occur if the printer is waiting for data to print; the interrupt overrun cycle may even occur in place of the hammer settle count during idling if the control processor fails to recognize the printer within a predetermined time. The scan count cycle can also occur at a designated place in the interrogation sequence or at other places if certain other signal timings are not required. The particular priority and logic desired are optional.

From the foregoing, it will be apparent that the multiplexer can readily and inexpensively accommodate a large number of functions to be controlled and wide variation in times. The need for function control signals in many types of equipment can usually be grouped according to types of operation and it is, therefore, relatively simple to combine operational qualifications to logically consolidate the required controls in circuits. Also, the number of storage locations in a memory device can be contracted or expanded according to need and the number of signals in a fixed sequence can be changed to facilitate increased storage. If need be, the frequency of the sequence signals can also be changed according to the time required for data manipulation.

While the invention has been particularly shown and described with reference to a preferred embodiment thereof, it will be understood by those skilled in the art that the foregoing and other changes in form and details may be made therein without departing from the spirit and scope of the invention.

I claim:

1. Apparatus for generating timed control signals for initiating each of a plurality of different operations comprising:

means for generating a control signal for initiating one of a plurality of operations;

clock means for repetitively generating fixed sequences of output signals;

storage means for storing therein at a preselected address for each said operation a predetermined value representative of the number of interrogations of said storage means to occur between successive ones of said control signals for each of said operations;

means for accumulating at a preselected address therein for each said operation a value indicating the number of said interrogations occurring since the last generation of a said control signal for the respective operation; and means for selecting certain of said sequences; and said means for generating including means responsive to predetermined signals within each of said selected ones of said sequences for interrogating and thereafter comparing said accumulated and stored values of said interrogations at corresponding ones of said addresses and issuing said control signal for said operations when said values are equal and for incrementing by one said accumulated value when said values are unequal.

2. Apparatus as described in claim 1 further including means operable on the occurrence of a said control signal for resetting said respective accumulator means.

3. Apparatus for generating timed control signals for initiating each of a plurality of different operations comprising:

means for generating a control signal for initiating one of a plurality of operations;

clock means for repetitively generating fixed sequences of output signals;

means for selecting certain of said sequences for each of said operations:

means for storing a predetermined value representative of the number of selected signal sequences to occur between successive ones of said control signals for each of said operations;

means for accumulating for each said operation a respective value indicating the number of said selected signal sequences generated since the last occurrence of a said control signal for each said operation; and said means for generating including means responsive to said selected sequences for comparing corresponding ones of said accumulated and stored values for each said operation and issuing a said control signal for initiating said operation when said values are equal, and incrementing by one the accumulated value when said values are unequal.

4. Apparatus as described in claim 3, further including means operable upon the occurrence of a said control signal for a said operation for resetting the corresponding value in said accumulator means.

5. Apparatus as described in claim 3, wherein said storing means and said accumulating means are included in a single memory device having a plurality of addresses and a pair of data storage locations at each said address.

6. Apparatus as described in claim 3, further including means for recording in said storage means said plurality of values during the occurrence of said selected ones of said signals in said clock sequences.

7. Apparatus for generating timed control signals for initiating each of a plurality of different operations comprising:
means for generating a control signal for initiating one of a plurality of operations;
clock means for repetitively generating fixed sequences of output signals:
means for selecting certain of said sequences for each of said operations;
means for storing a predetermined value representative of the number of selected signal sequences to occur between successive ones of said control signals for each of said operations;
means for accumulating for each said operation a respective value indicating the number of said selected signal sequences generated since the last occurrence of said control signal therefor;
said means for generating including means responsive to a predetermined one of said signals in a selected sequence for comparing said accumulated and stored values and issuing a said control signal for initiating said operation when said values are equal; and
means responsive to said comparing means and a next successive signal in a said selected sequence following said predetermined signal for adding one to said accumulated value and storing said altered accumulated value in said accumulating means when said stored and accumulated values are unequal.

8. Apparatus as described in claim 3, wherein said comparing and incrementing means are operable in response to a pair of signals in a said selected sequence.

9. Apparatus as described in claim 3, further including means responsive to a predetermined signal in a selected one of said sequences for determining the particular one of a plurality of said operations which is to have its stored and accumulated values compared by said comparing means.

10. Apparatus as described in claim 9, wherein certain of said operations are controlled by different ones of said signals in a said sequence.

* * * * *